Sept. 14, 1954 E. I. ANDERSON 2,689,299
PULSE SELECTOR CIRCUIT
Filed May 7, 1949 2 Sheets-Sheet 1

INVENTOR
EARL I. ANDERSON
BY
ATTORNEY

Sept. 14, 1954 E. I. ANDERSON 2,689,299
PULSE SELECTOR CIRCUIT
Filed May 7, 1949 2 Sheets-Sheet 2

INVENTOR
EARL I. ANDERSON
BY [signature]
ATTORNEY

Patented Sept. 14, 1954

2,689,299

UNITED STATES PATENT OFFICE 2,689,299

PULSE SELECTOR CIRCUIT

Earl I. Anderson, Manhasset, N. Y., assignor to Radio Corporation of America, a corporation of Delaware Application May 7, 1949, Serial No. 91,963

5 Claims. (Cl. 250—27)

This invention relates to a pulse selector circuit and in particular to a circuit for eleminating the effects of noise on a train of pulses so as to supply pulses of uniform spacing.

It is conventional in the television art to supply a series of pulses for the purpose of synchronizing the horizontal sweeping of the television receiver with horizontal sweeping at the transmitter pick-up tube. However, thermal agitation and impulse noise pulses change the apparent spacing between the transmitted sync pulses and accordingly the electron beam in the television receiver starts its travel across the face of the tube before the corresponding horizontal line is swept in the transmitter.

Advantage has been taken of the fact that the average spacing of such pulses remain unchanged even though the spacing between any given pulses may be altered and automatic frequency control circuits sometimes called A. F. C. circuits have been designed to work on the average spacing of these pulses. Although the performance of the latter type circuits is very good, it is the purpose of this invention to achieve similar results with a simplified circuit arrangement.

According to this invention, after the sync pulses have been separated from the blanking pulse, they are fed to an amplifier having a tuned selective circuit connected in series with it. The output circuit is inductively coupled to the tuned circuit for isolation from B+ or to reverse polarity. If the selective circuit is tuned to the repetition frequency or harmonic thereof of the sync pulses, it integrates their effect over a period of time and the aperiodic noise pulses have no accumulative effect.

Accordingly, it is the purpose of this invention to provide a circuit arrangement whereby amplitude modulated sync pulses are supplied to the sweep circuits of a television receiver at uniform intervals.

Another object of the invention is to provide an improved circuit arrangement whereby noise does not affect the apparent spacing of the sync pulses transmitted to the deflection circuits of the television receiver.

These and other advantages will be apparent from consideration of the following figures in which.

Figure 1:
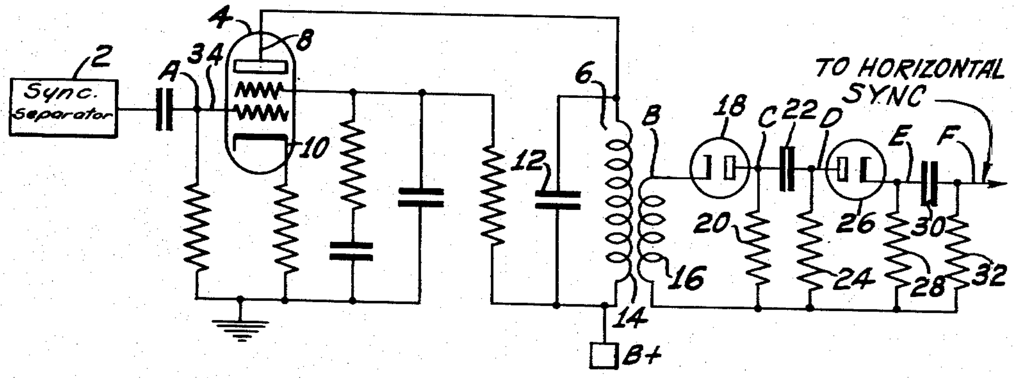
Figure 1 shows a circuit arrangement embodying the principles of the invention.

In the circuit shown in Figure 1, the numeral 2 indicates a source of sync pulses that may comprise the conventional type of sync pulse separator and the numeral 4 indicates a conventional amplifier or electron discharge device having a high "Q" tuned circuit 6 in series with its plate 8 and its cathode 10. This parallel resonant circuit 6 is comprised of a condenser 12 and a winding 14 that is inductively coupled to an output coil 16. In order that the sine wave voltage appearing in coil 16 may be sharpened into a train of pulses suitable for triggering the horizontal deflection circuits of a television receiver, the sine wave is first rectified by a diode 18 having a load resistance 20 shunted from its plate to the other side of the coil 16 so as to form a first loop. The voltage across the load resistance 20 is differentiated by a condenser 22 and a resistor 24 that are connected in series parallel with the resistor 20 so as to form a second loop. The voltage available at the junction of the condenser 22 and the resistor 24 is again rectified by a diode 26 connected in series opposition to the diode 18 and in series with another load resistor 28, the diode in the resistor being connected in series parallel relationship with the resistor 24 so as to form a third loop. The voltage developed across the resistor 28 is again passed through a differentiation circuit comprising a condenser 30 and a resistor 32 that is connected in series parallel relationship with the resistor 28 so as to form a fourth loop and the output voltage is obtained across this resistor 32.

Figure 2:
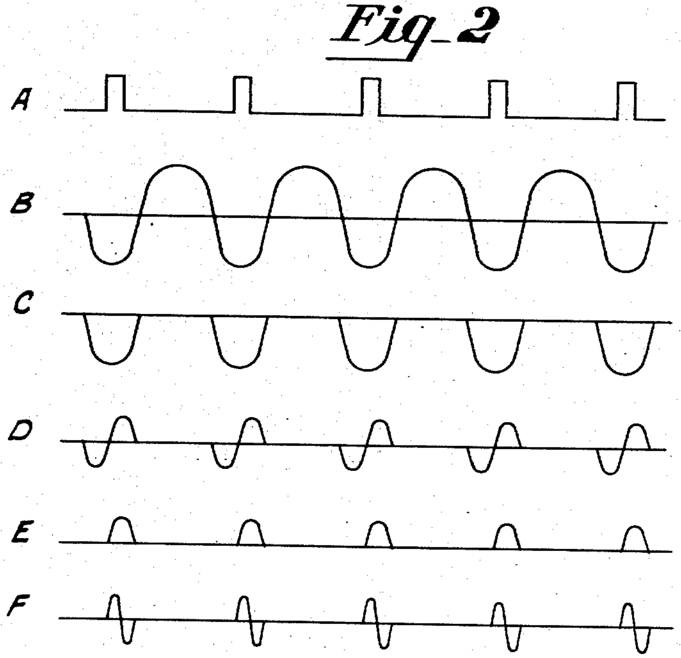
Figure 2 shows wave forms that appear at various points in the circuit of Figure 1.

In order to understand the operation of the circuit, reference is made to Figure 2 in which the wave forms opposite the various letters indicate the wave forms that would be obtained within an oscilloscope at the corresponding lettered points marked in the circuit diagram. As stated before, the sync pulses are supplied by unit 2 to the grid 34 of the amplifier 4 and are in the form shown at A. Because the circuit 6 is tuned to the pulse repetition frequency, it is shock excited into oscillation so as to produce a sinusoidal wave warm as indicated at B. The design of the circuit must be such as to realize appreciable operating "Q" in circuit 6 so that the phase of the sine wave energy in it will be determined primarily by the steadily recurrent synchronizing pulses as integrated over a period of time long enough to average out the effects of the interfering noise pulses whose phasings are at random with respect to the synchronizing pulses. As a practical matter the "Q" is chosen to be high enough to obtain a substantial improvement with respect to noise yet low enough to retain enough speed to enable the circuit to follow the line frequency variations at the transmitter.

Other pulse forming networks might be connected to the output circuit 6. However, the one shown in this figure will be described in detail for purposes of illustration as it has been found adequate for the purpose. It is at once apparent that the wave form C, in other words the voltage across resistor 20, comprises only the negative half cycles of the sine wave shown at B because of the polarity of the diode 18. Inasmuch as a differentiation circuit has an output proportional to the rate of change of the input voltage, the wave form shown at C is transformed into a wave having positive and negative loops such as indicated at D. Whereas it might be possible to use the positive loops of voltage indicated at D for triggering sweep circuits of a television receiver, narrower pulses may be obtained by repeating the process. Therefore, the wave forms at E and F are derived in the same manner as those at C and D but are of less duration. Of course, narrower pulses could be obtained by addition of other stages such as the 2 already described. However, the circuit as shown was found to be satisfactory.

Figure 3:
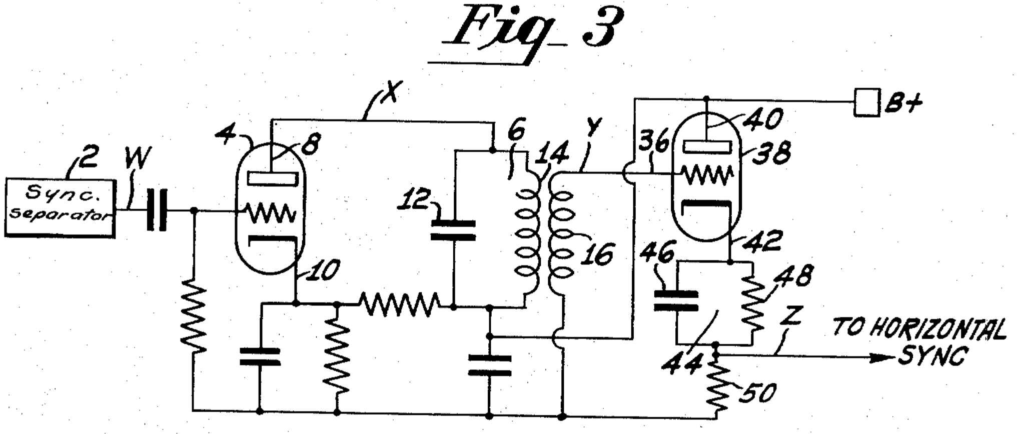
Figure 3 shows a different circuit arrangement embodying the principles of the arrangement.
Figure 4:
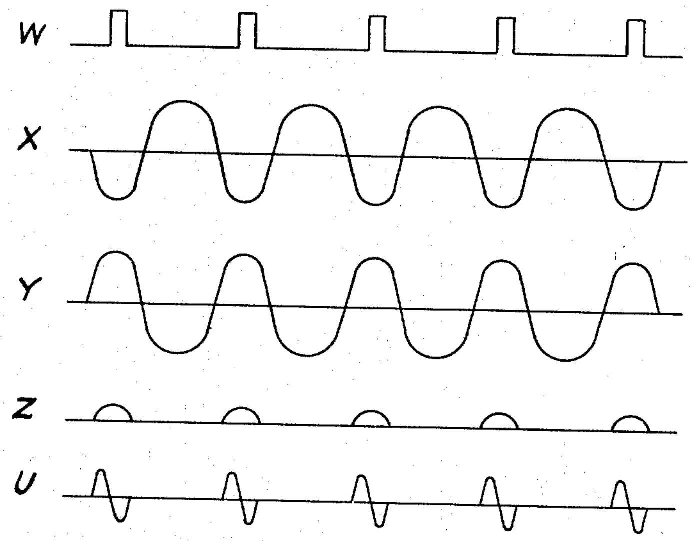
Figure 4 shows wave forms obtained at various points in the circuit of Figure 3.

Another circuit embodying the principles of the invention is shown in Figure 3 in which corresponding component parts are indicated by the same numeral. However, the wave forms found in Figure 4 are indicated by a different series of letters, the letters being marked on the circuit diagram. Accordingly, the pulses at W are supplied by the unit 2 to an amplifier 4 having a tuned circuit 6 connected in series with its plate 8 and its cathode 10. The tuned circuit is designed as previously described. Winding 16 is used to reverse the polarity of the voltage with respect to that across the tuned circuit and is connected between control electrode 36 and ground. The plate 8 of the amplifier 4 and the plate 40 of the amplifier 38 are connected to a source of direct potential. The cathode 42 is connected in series with a biasing circuit 44 comprised of parallel condenser 46 and resistance 48 and an output resistor 50 across which the pulses are developed that are to be supplied to the sweep circuits of the receiver.

Accordingly, the train of pulses that appears at point W is applied to the amplifier control element of the amplifier 4 and serves to excite the tuned circuit 6 in a manner such as described in connection with Figure 1. Whereas, the principles of operation are the same as previously described, a simplified means is provided for developing a train of pulses that would be suitable for use in triggering the horizontal deflection circuits at uniform intervals. The sinusoidal wave form at X is reversed in phase at Y because of the polarity of the windings 14 and 16. The sine wave shown at Y is then rectified because the cathode 42 is held at a positive potential with respect to ground by the biasing circuit 44 and therefore only a portion of the positive loops shown at Y are available across the resistor 50 and are indicated by the letter Z. These may be differentiated if shorter pulses are desired as shown at U. If synchronizing pulses of opposite polarity are desired the load resistor 50 may be placed in series with the anode 40 of tube 38.

It may be seen from Figures 2 and 4 that the output keying pulse derived from each of the pulse shaping circuits described is substantially in phase with the input synchronizing pulses if tuned circuit 6 is adjusted for this condition. If separate control of the phase is desired, it may be obtained by tuning the pick-up circuit or by the addition of a phase shift network at V in Figures 1 and 3.

It is, therefore, believed that the use of an inductively coupled high "Q" circuit tuned to the repetition frequency of the sync pulses makes a distinct step forward in the art because it gives satisfactory performance with fewer component parts.

Having described my invention, I claim:

1. A selector circuit for supplying pulses at regular intervals in response to a train of synchronizing pulses comprising an electron discharge device having at least a plate, a grid, and a cathode, a coupling circuit in circuit relationship with said grid, a parallel tuned circuit having a coil and a condenser, a source of direct potential, said source and said tuned circuit being connected in series with said plate and cathode, a winding, a diode and a first resistor connected in series so as to form a first loop, said winding being inductively coupled to said coil, and a second loop formed by a condenser and a second resistor connected in series parallel relationship with said first resistor.

2. A selector circuit for supplying pulses at regular intervals in response to a train of synchronizing pulses comprising an electron discharge device having at least a plate, a grid, and a cathode, a coupling circuit in circuit relationship with said grid, a parallel tuned circuit having a coil and a condenser, a source of direct potential, said source and said tuned circuit being connected in series with said plate and cathode, a winding, a first diode and a first resistor connected in series so as to form a first loop, said winding being inductively coupled to said coil, and a second loop formed by a first condenser and a second resistor connected in series parallel relationship with said first resistor, a second diode connected in series opposition to the first and a third resistor connected in series parallel with said second resistor, so as to form a third loop, and a fourth loop formed by a second condenser and a resistor in series parallel relationship with said third resistor.

3. A stabilization circuit having an output circuit, said stabilization circuit comprising in combination, a source of regularly recurring pulses, an electron discharge device having at least a plate, a grid, and a cathode, a parallel resonant circuit, a pulse forming circuit, said pulse forming circuit comprising a diode and a resistance connected in series and a differentiating circuit connected across said resistance, said grid adapted to be connected to said source of pulses through an impedance network, said plate connected to said parallel resonant circuit, said parallel resonant circuit inductively coupled to said pulse forming circuit, said output circuit connected to said pulse forming circuit.

4. A stabilization circuit having an output circuit, said stabilization circuit comprising in combination, a source of regularly recurring pulses, an electron discharge device having at least a plate, a grid, and a cathode, a source of direct potential, a parallel resonant circuit, a pulse forming circuit, said pulse forming circuit comprising a diode and a resistance connected in series and a differentiating circuit connected across said resistance, said grid connected to said source of pulses through an impedance network, said source of direct potential and said parallel resonant circuit connected in series with said plate and said cathode, said parallel resonant circuit inductively coupled to said pulse forming circuit, said output circuit connected in series with said pulse forming circuit.

5. A pulse selector circuit for providing pulses at regular intervals in response to a train of synchronizing pulses comprising a parallel resonant circuit adapted to be shock excited by said train of synchronizing pulses, a first unilateral conducting means, a first impedance connected in series with said first unilateral conducting means, means coupling said first unilateral conducting means to said parallel resonant circuit, a first differentiating means connected across said first impedance, a second unilateral conducting means coupled to said first differentiating means, a second impedance connected in series with said second unilateral conducting means, and a second differentiating means connected across said second impedance.

References Cited in the file of this patent

UNITED STATES PATENTS

| Number | Name | Date |
|---|---|---|
| 2,181,309 | Andrieu | Nov. 28, 1939 |
| 2,277,000 | Bingley | Mar. 17, 1942 |
| 2,410,000 | Anderson | Oct. 29, 1946 |
| 2,416,111 | Maxwell | Feb. 18, 1947 |
| 2,418,375 | Tourshou | Apr. 1, 1947 |
| 2,431,577 | Moore | Nov. 25, 1947 |
| 2,440,278 | Labin et al. | Apr. 27, 1948 |
| 2,477,615 | Ibister | Aug. 2, 1949 |